United States Patent [19]

Itoh

[11] Patent Number: 4,756,608
[45] Date of Patent: Jul. 12, 1988

[54] HIGH ZOOM-RATIO FINITE-DISTANCE ZOOM LENS

[75] Inventor: Takayuki Itoh, Tokyo, Japan

[73] Assignee: Asahi Kogaku Kogyo Kabushiki Kaisha, Tokyo, Japan

[21] Appl. No.: 911,939

[22] Filed: Sep. 26, 1986

[30] Foreign Application Priority Data

Sep. 26, 1985 [JP] Japan ................. 60-214054

[51] Int. Cl.$^4$ .................. G02B 15/14; G02B 9/64
[52] U.S. Cl. .................................... 350/427
[58] Field of Search ........................... 350/427

[56] References Cited

U.S. PATENT DOCUMENTS 4,359,270 11/1982 Okudaira ..................... 350/427
4,629,294 12/1986 Tanaka et al. ................ 350/427
4,632,519 12/1986 Takahashi .................... 350/427

Primary Examiner—John K. Corbin
Assistant Examiner—Rebecca D. Gass
Attorney, Agent, or Firm—Sughrue, Mion, Zinn, Macpeak, and Seas

[57] ABSTRACT

A high zoom-ratio finite-distance lens with fixed object-to-image distance having arranged from the object side a first lens unit of positive focal length, a second lens unit of negative focal length and third and fourth lens units of positive focal length. The first, third and fourth lens units are moved relative to the second lens units. Conditions are set on the magnifications of the first, second and fourth lens units at the ends of the magnification range, on the relative displacements of the third and fourth lens units and on the location of the entrance pupil.

12 Claims, 6 Drawing Sheets

HIGH ZOOM-RATIO FINITE-DISTANCE ZOOM LENS

BACKGROUND OF THE INVENTION

1. Field of the Invention

The present invention relates to a finite-distance zoom lens having a fixed object-to-image distance which is capable of attaining a zoom ratio of as high as 4 in the low-magnification range alone (or in the high-magnification range if the object and the image are reversed in position).

2. Background Art

A finite-distance zoom lens can be used either in the low-magnification range or in the high-magnification range. The use in a facsimile transmitter is a typical example of the low-magnification application and the use in an enlarger is an example of the high-magnification type of use. Either type of zoom lens is capable of continuous variation of the magnification with the object-to-image distance being held constant.

The known zoom lenses are classified into the following three types according to the range of attainable magnifications.

(I) A zoom lens for use with a still camera which is capable of varying the magnification from zero (at infinite distance) to about one-tenth;

(II) a zoom lens for use with a copier which has a magnification in the neighborhood of unity; and (III) a zoom lens having an intermediate range of magnification.

a zoom lens of the first type that is capable of attaining a zoom ratio in the range of 4 to 5 is known but it experiences a fairly large distortion (3–5%) and is not suitable for use as a finite-distance zoom lens of the type contemplated by the present invention.

A zoom lens of the second type that is capable of attaining a high zoom ratio in the range of 4 to 9 and which nonetheless experiences small distortion is available. The relative lens layout of this zoom lens is substantially the same in both the low- and high-magnification ranges with respect to unity magnification. Its lens configuration is virtually symmetrical enough to allow the distortion to be decreased fairly easily. However, at a magnification in the neighborhood of unity, the distance between the lens and the image plane is so great as to render unattainable a lens system of the type contemplated by the present invention which has a high zoom ratio only in the low-magnification range (or alternatively in the high-magnification range).

Most of the third type of finite-distance zoom lenses having an intermediate range of magnification that have been proposed to data are only capable of attaining a zoom ratio of less than 2. Two exceptions which are capable of a high zoom ratio of 4 are described in Unexamined Published Japanese Patent Application Nos. 214009/1984 and 150020/1985. However, the zoom lens shown in Unexamined Published Japanese Patent Application No. 214009/1984 is complicated in construction in that all of the lens groups are displaced by very large amounts during zooming. Thus, in this respect, there is room for improvement. The system proposed in Unexamined Published Japanese Patent Application No. 150020/1985 requires a smaller amount of displacement of the lens groups and has attained simplicity in the overall construction. However, there still is room for improvement with respect to chromatic aberration at the high-magnification end. In addition, both systems have the disadvantages that they have a large object-to-image distance and that the overall size of the equipment is thereby increased.

SUMMARY OF THE INVENTION

Accordingly, an object of the present invention is to provide an improvement in a finite-distance zoom lens having a fixed object-to-image distance and which features an intermediate range of magnification and attains a zoom ratio of as high as 4 in the low-magnification range alone (or in the high-magnification range if the object and the image are reversed in position).

The improvement provided by the present invention is directed to the system shown in Unexamined Published Japanese Patent Application No. 150020/1985 and provides a smaller object-to-image distance and an effective correction of the chromatic aberration (especially one occurring the wavelength range of 500–650 nm) at the high magnification end.

The structure is summarized as first, third and fourth lens units, all having positive focal lengths which are movable with respect to a negative focal length second lens unit located between the first and third lens units.

DETAILED DESCRIPTION OF THE PREFERRED EMBODIMENTS

Figure 1:
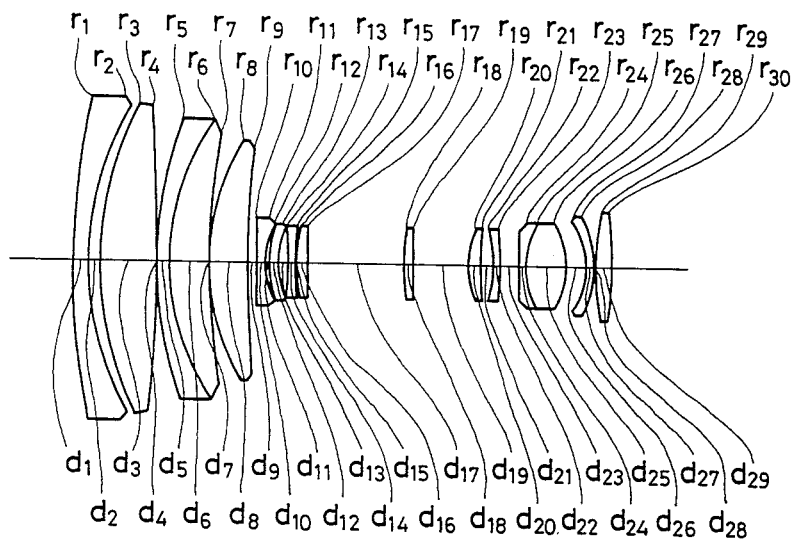
FIGS. 1, 3 and 5 show in cross section the lens system configurations at the low-magnification end according to Examples 1, 2 and 3 of the present invention.

The high zoom-ratio finite-distance zoom lens of the present invention has a fixed object-to-image distance and comprises, in order from the object side, a first lens unit having a positive focal length, a second lens unit having a negative focal length, a third lens unit having a positive focal length. This lens system is capable of zooming from low to high magnification by means of displacing the first, third and fourth lens units toward the object side, and satisfies the following five conditions:

$$0.3 < m_s/m_{1s} < 0.6 \tag{1}$$

$$1.8 < m_{2L}/m_{2s} < 2.6 \tag{2}$$

$$1.7 < m_{4L}/m_{4s} < 2.5 \tag{3}$$

$$0.1 < X_3/X_4 < 0.9 \tag{4}$$

$$0.9 < ENP_L/f_L < 1.8 \tag{5}$$

where $m_s$: the magnification of the overall system at the low magnification end;

$m_{1s}$: the magnification of the first lens unit at the low magnification end;

$m_{2s}$: the magnification of the second lens unit at the low magnification end;

$m_{4s}$: the magnification of the fourth lens unit at the low magnification end;

$m_{2L}$: the magnification of the second lens unit at the high magnification end;

$m_{4L}$: the magnification of the fourth lens unit at the high magnification end;

$X_3$: the amount of displacement of the third lens unit;

$X_4$: the amount of displacement of the fourth lens unit;

$ENP_L$: the position of entrance pupil (distance from the first lens surface) at the high magnification end; and $f_L$: the focal length of the overall system at the high magnification end.

The concept of entrance pupil is well known in the optical field and is described, for example, by Jenkins and White in "Fundamentals of Optics," fourth edition.

In a preferred embodiment, the first lens unit is composed of, in order from the object side, a first lens element with a negative meniscus, a second positive lens element, a third lens element with a negative meniscus, a fourth positive lens element, and a fifth positive lens element. Each of the five lens elements have a convex surface on the object side. The three positive lens elements (the second, fourth and fifth lens elements) in the first lens group satisfy the following condition:

$$63 < \bar{\nu}_{1p} \qquad (6)$$

where $\bar{\nu}_{1p}$ is the mean Abbe number of these three positive lens elements.

The second lens unit is composed of, in order from the object side, two or three negative lens elements and a positive lens element having a convex surface on the object side.

The third lens unit consists of a single positive lens element.

The fourth lens unit is composed of, in order from the object side, a positive lens element having a convex surface on the object side, a negative meniscus lens element having a concave surface on the object side, a cemented lens composed of a negative lens element and a biconvex positive lens element, a negative-meniscus lens element having a concave surface on the object side, and a positive lens element having a convex surface on the object side.

In another preferred embodiment, the high zoom-ratio finite-distance zoom lens of the present invention is characterized in that the first and fourth lens units are displaced en masse, with the second lens unit being fixed with respect to the image plane.

Condition (1) of $0.3 < m_s/m_{1s} < 0.6$ relates to the power distribution in the first lens unit. The first lens unit itself is little effective for zooming purposes but can be displaced toward the object side so as to provide a contribution to the zooming effect of the second lens unit having a negative focal length. If the lower limit of condition (1) is not reached, a condition which is favorable to the purpose of correcting aberrations is attained but, on the other hand, the effectiveness in assisting in the zooming capability of the second lens unit is decreased and the amount of displacement of the fourth lens group during zooming is increased to such an extent that the requirement for reducing the overall size of the lens system is not satisfied. If the upper limit of condition (1) is exceeded, the power of the first lens unit becomes excessive to cause such undesired effects as the occurrence of higher-order aberrations, variations in the spherical aberration during zooming, and the increase in the chromatic aberration at the high-magnification end.

Condition (2) of $1.8 < m_{2L}/m_{2S} < 2.6$ and condition (3) of $1.7 < m_{4L}/m_{4S} < 2.5$ must be met in order to attain balance between the zoom ratio attained by the second lens unit and that provided by the fourth lens unit. The system shown in Unexamined Published Japanese Patent Application No. 150020/1985 fails to meet these conditions by exceeding the upper limit of condition (2) and falling short of the lower limit of condition (3). As a result, the optical load of the second lens unit is increased to upset the balance with the fourth lens unit.

Condition (2) relates to the zoom ratio to be attained by the second lens unit. If the upper limit of condition (2) is exceeded, the optical load of this lens unit is increased and great variations will occur in chromatic aberration and curvature of image during zooming, with the result that high resolution is not attainable for all of the intended magnifications and image heights. If the lower limit of condition (2) is not reached, the optical load of the fourth lens unit and, hence, the amount of its displacement is increased, which runs counter to the purpose of reducing the overall size of the system. In addition, the numerical aperture (NA) of the lens system is liable to become small at the high-magnification end.

Condition (3) relates to the zoom ratio to be attained by the fourth lens unit. If the upper limit of this condition is exceeded, the optical load of the fourth lens unit and, hence, the amount of its displacement are increased. If the lower limit of condition (3) is not reached, the optical load of the second lens unit is increased and great variations will occur in chromatic aberration and curvature of image during zooming.

Condition (4) of $0.1 < X_3/X_4 < 0.9$ relates to the displacement of the third lens unit relative to that of the fourth lens unit. The third lens unit has no zooming effect but by adjusting the distance between the third and fourth lens units, effective correction of the curvature of image can be achieved at all of the intended magnifications. If the lower limit of condition (4) is not reached, a realistic lens configuration is not physically attainable since in order to meet condition (3), the third and fourth lens units must be reversed in position at the high-magnification end. In order to avoid this reversal, the amount of displacement of the fourth lens unit must be decreased as shown in Unexamined Published Japanese Patent Application No. 150020/1985. However, then the optical load of the second lens unit is increased and great variations will occur in chromatic aberration and curvature of image during zooming. If the upper limit of condition (4) is exceeded, the amount by which the distance between the third and fourth lens unit can be changed is decreased and the ability of the third lens unit to correct the curvature of image is reduced correspondingly.

Condition (5) of $0.9 < ENP_L/f_L < 1.8$ relates to the position of the entrance pupil. The distortion that is permissible for the zoom lens of the present invention is within about $\pm 0.5\%$ which is much smaller than what is tolerated by the zoom lens intended for use with a still camera. This is why the entrance pupil must be positioned sufficiently far from the first lens surface in the system of the present invention. If the lower limit of condition (5) is not reached, increased distortion will result. If the upper limit of condition (5) is exceeded, a condition s attained which is favorable to the purpose of correcting the distortion. However, then the diameter of the first lens unit is increased, which is incompatible with the requirement for reducing the overall size of the lens system.

Condition (6) of $\bar{v}_{1p} > 63$ is preferably satisfied if one wants to achieve more effective correction of the chromatic aberration at the high magnification end after meeting all of the aforementioned conditions (1) to (5). If this condition is not met, difficulty is encountered in correcting the chromatic aberration.

It is structurally preferable that the first and fourth lens units can be displaced en masse or that the second lens unit is fixed with respect to the image plane.

Examples 1 to 3 of the present invention are described hereinafter. In the data presented in these examples: $r_i$ signifies the radius of curvature of the i-th individual lens surface; $d_i$ is the thickness of a lens or the aerial distance between two adjacent lenses; $N_i$ is the refractive index of an individual lens with respect to the d-line; $v_i$ is the Abbe number of an individual lens; $F_e$ is a finite effective F number; f is the focal length of the overall system; Y is the image height (radius); m is the lateral magnification; U is the object-to-image distance; and $f_B$ is the back-focal distance. Note that the radii $r_6$ and $r_{25}$ in Example 1, $r_6$ and $r_{25}$ in Example 2 and $r_6$, $r_{11}$, $r_{12}$ and $r_{23}$ in Example 3 apply to two neighboring lenses between which there is no separation.

Figure 3:
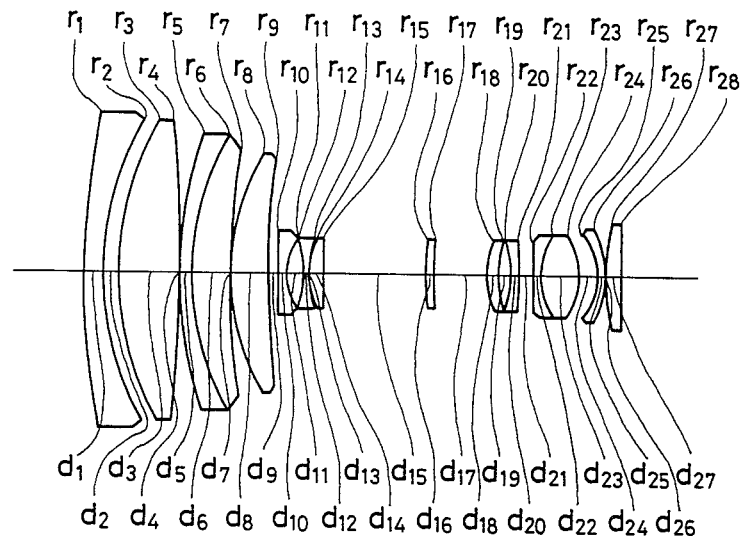
Figure 5:
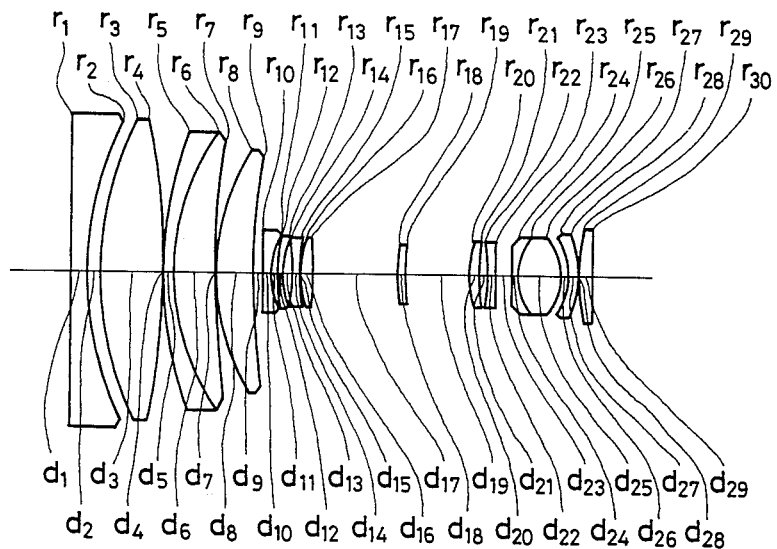

The structure of the three examples at low magnification is presented in FIGS. 1, 3 and 5 respectively with the numerical values being listed in the respective tables. Also presented are various types of aberrations: spherical aberration (SA), sine condition (SC), chromatic aberration for the d-line, g-line and c-line, astigmatism along the saggital direction (S) and the meridional direction (M) and the distortion. The spherical aberration, sine condition and chromatic aberration are plotted as a function of the effective F number $F_e$ while the astigmatism and distortion are plotted as a function of the image height Y.

Figure 2A:
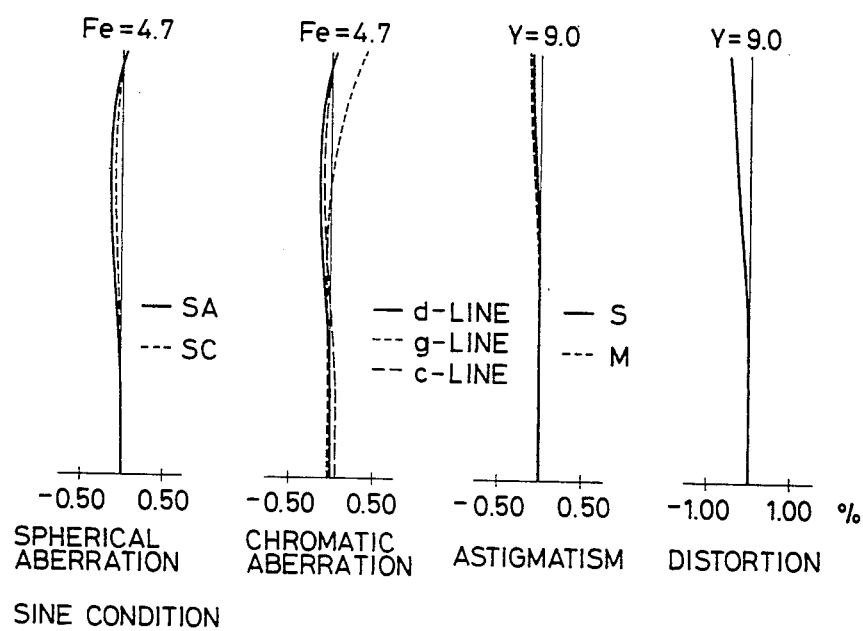
FIGS. 2(*a*), (*b*) and (*c*), FIGS. 4(*a*), (*b*) and (*c*) and FIGS. 6(*a*), (*b*) and (*c*) are graphs plotting the aberration curves obtained at the low-magnification end (a), at an intermediate magnification (b) and at the high-magnification end (c), respectively, of the systems according to Examples 1, 2 and 3.
Figure 2B:
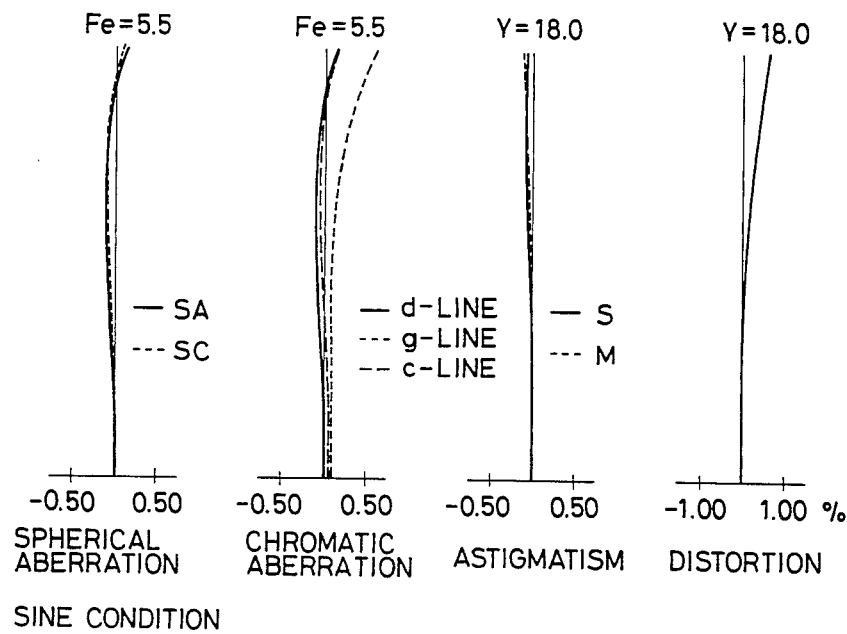
Figure 2C:
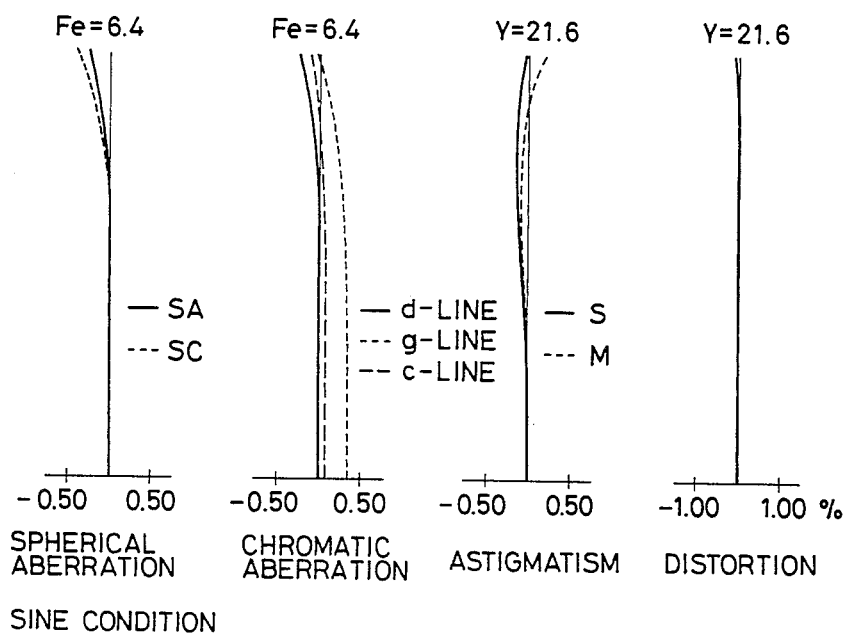
Figure 4A:
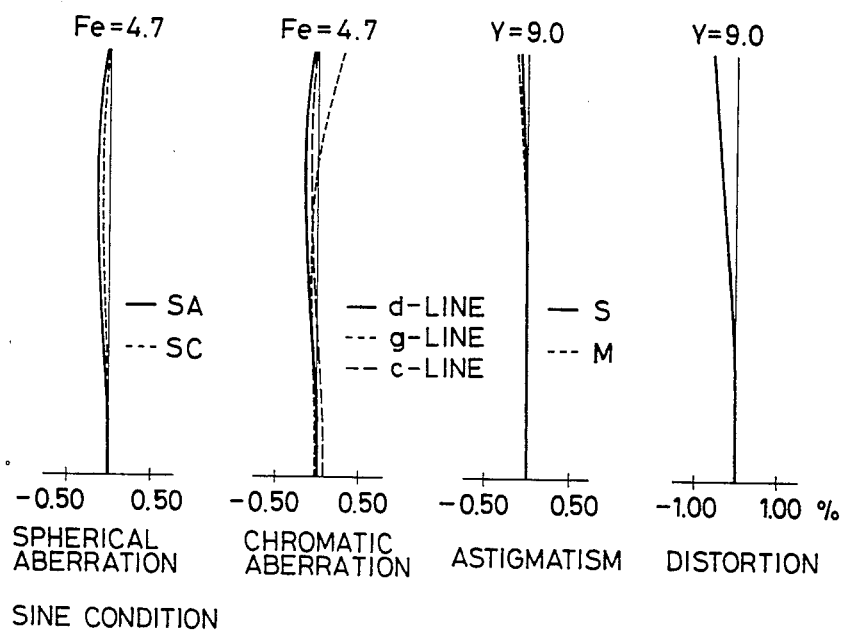
Figure 4B:
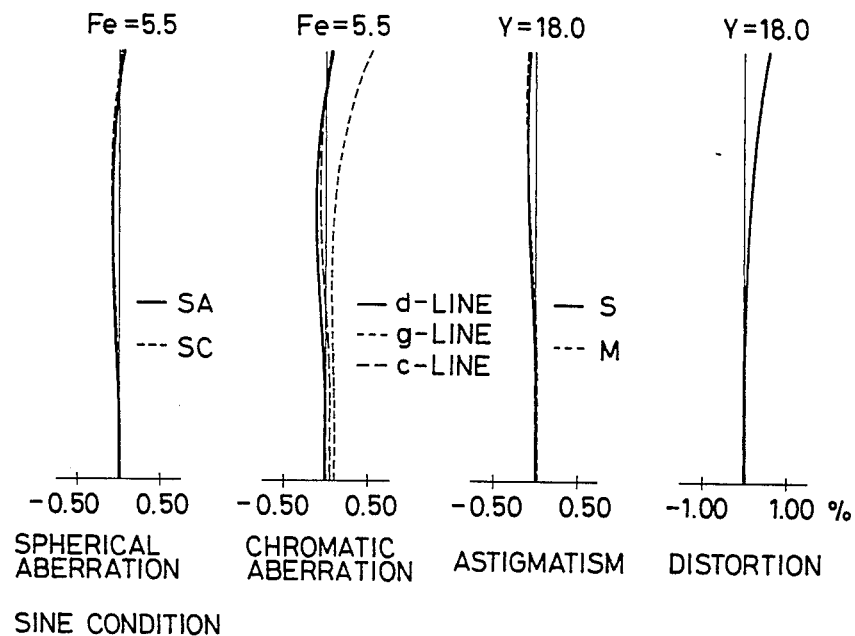
Figure 4C:
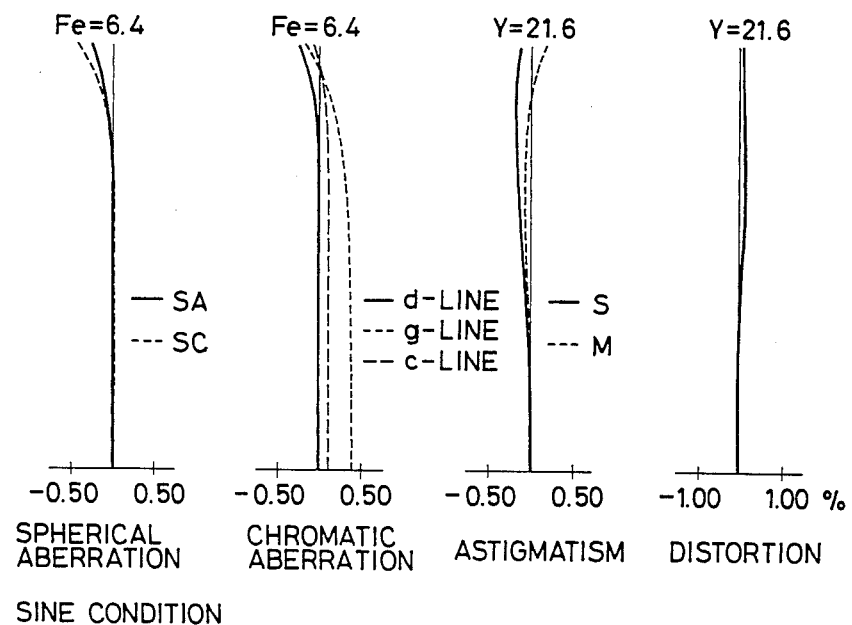
Figure 6A:
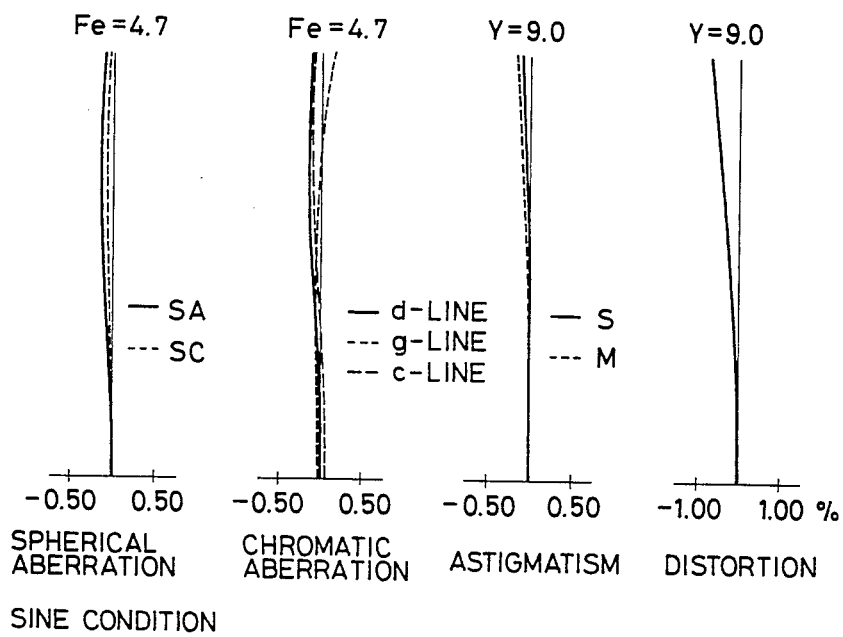
Figure 6B:
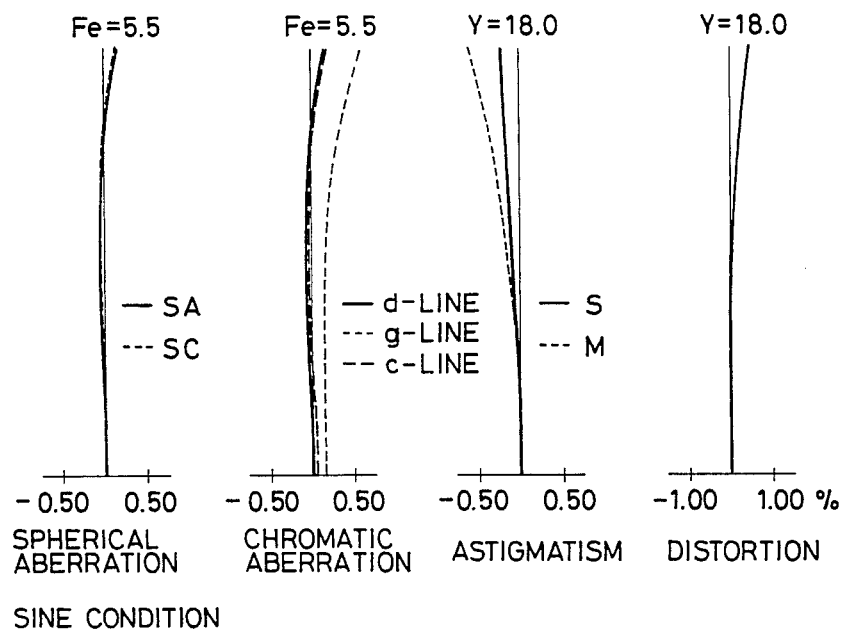
Figure 6C:
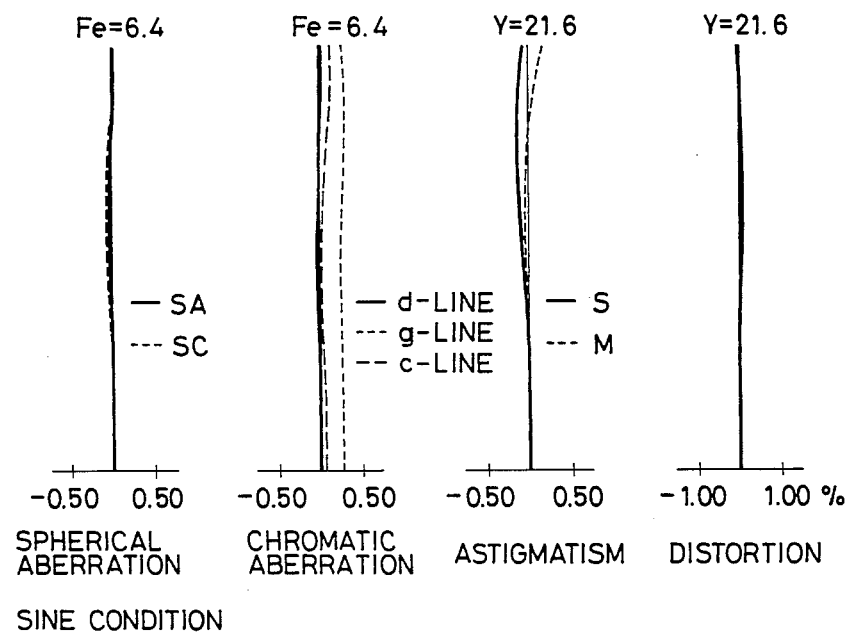

The aberration are presented in FIGS. 2(a)–2(c) for Example 1, in FIGS. 4(a)–4(c) for Example 2 and in FIGS. 6(a)–6(c) for Example 3. The aberrations at the low magnification end are illustrated in FIGS. 2(a), 4(a) and 6(a), at medium magnification in FIGS. 2(b), 4(b) and 6(b) and at the high magnification end is FIGS. 2(c), 4(c) and 6(c).

EXAMPLE 1

| | $F_e = 4.7–6.4$ | | $m = 1/12.4–1/3.1$ | |
| | $U = 575$ | | $f = 36.3–121.8$ | |
| | $f_B = 55.9–82.0$ | | $Y = 9–21.6$ | |
| i | $r_i$ | $d_i$ | $N_i$ | $v_i$ |
|---|---|---|---|---|
| 1 | 159.718 | 3.500 | 1.60342 | 38.0 |
| 2 | 63.584 | 1.956 | | |
| 3 | 67.000 | 11.300 | 1.61800 | 63.4 |
| 4 | −722.505 | 0.250 | | |
| 5 | 77.216 | 2.850 | 1.80518 | 25.4 |
| 6 | 48.651 | 8.200 | 1.48749 | 70.1 |
| 7 | 143.202 | 0.200 | | |
| 8 | 45.470 | 7.900 | 1.61800 | 63.4 |
| 9 | 194.955 | 2.300–28.42 | | |
| 10 | −1608.176 | 1.500 | 1.77250 | 49.6 |
| 11 | 15.000 | 1.333 | | |
| 12 | 31.514 | 1.450 | 1.69680 | 55.5 |
| 13 | 20.769 | 2.223 | | |
| 14 | −42.300 | 1.400 | 1.69680 | 55.5 |
| 15 | 73.875 | 0.100 | | |
| 16 | 26.650 | 2.700 | 1.80518 | 25.4 |
| 17 | −725.128 | 20.505–2.5 | | |
| 18 | 45.821 | 1.700 | 1.69680 | 55.5 |
| 19 | 125.182 | 11.618–3.5 | | |
| 20 | 19.823 | 2.400 | 1.69680 | 55.5 |
| 21 | 47.326 | 2.834 | | |
| 22 | −25.362 | 1.400 | 1.53172 | 48.9 |
| 23 | −45.096 | 3.776 | | |
| 24 | 106.198 | 1.500 | 1.83400 | 37.2 |
| 25 | 17.350 | 8.500 | 1.48749 | 70.1 |
| 26 | −17.350 | 4.162 | | |
| 27 | −15.600 | 1.500 | 1.80610 | 40.9 |
| 28 | −26.112 | 0.100 | | |
| 29 | 46.238 | 3.200 | 1.54814 | 45.8 |
| 30 | −184.648 | | | |

$m_S/m_{1S} = 0.427$ $m_{2L}/m_{2S} = 2.180$ $m_{4L}/m_{4S} = 2.027$ $X_3/X_4 = 0.689$ $ENP_L/f_L = 1.396$ $\bar{v}_{1p} = 65.6$

EXAMPLE 2

| | $F_e = 4.7–6.4$ | | $m = 1/12.4–1/3.1$ | |
| | $U = 575$ | | $f = 36.13–117.8$ | |
| | $f_B = 55.9–82.23$ | | $Y = 9–21.6$ | |
| i | $r_i$ | $d_i$ | $N_i$ | $v_i$ |
|---|---|---|---|---|
| 1 | 168.138 | 3.500 | 1.60342 | 38.0 |
| 2 | 58.686 | 3.989 | | |
| 3 | 63.616 | 12.000 | 1.61800 | 63.4 |
| 4 | −465.854 | 0.100 | | |
| 5 | 90.013 | 2.850 | 1.80518 | 25.4 |
| 6 | 54.096 | 8.000 | 1.48749 | 70.1 |
| 7 | 169.871 | 0.200 | | |
| 8 | 45.588 | 7.900 | 1.61800 | 63.4 |
| 9 | 198.737 | 2.300–28.63 | | |
| 10 | 2818.623 | 1.500 | 1.77250 | 49.6 |
| 11 | 13.866 | 3.373 | | |
| 12 | −43.348 | 1.400 | 1.77250 | 49.6 |
| 13 | 43.348 | 0.411 | | |
| 14 | 25.982 | 2.700 | 1.80518 | 25.4 |
| 15 | −220.685 | 21.349–2.5 | | |
| 16 | 44.514 | 1.700 | 1.69680 | 55.5 |
| 17 | 101.824 | 10.976–3.5 | | |
| 18 | 16.552 | 2.400 | 1.69680 | 55.5 |
| 19 | 28.403 | 3.220 | | |
| 20 | −22.100 | 1.400 | 1.53172 | 48.9 |
| 21 | −43.520 | 2.528 | | |
| 22 | 48.045 | 1.500 | 1.83400 | 37.2 |
| 23 | 16.043 | 8.500 | 1.48749 | 70.1 |
| 24 | −16.043 | 3.603 | | |
| 25 | −13.443 | 1.500 | 1.80610 | 40.9 |
| 26 | −22.439 | 0.100 | | |
| 27 | 39.713 | 3.200 | 1.54814 | 45.8 |
| 28 | 309.057 | | | |

$m_S/m_{1S} = 0.436$ $m_{2L}/m_{2S} = 2.165$ $m_{4L}/m_{4S} = 2.014$ $X_3/X_4 = 0.716$ $ENP_L/f_L = 1.296$ $\bar{v}_{1p} = 65.6$

EXAMPLE 3

| | $F_e = 4.7–6.4$ | $m = 1/14–1/3.5$ |
| | $U = 575$ | $f = 32.5–107.9$ |
| | $f_B = 50.23–76.18$ | $Y = 9–21.6$ |

-continued

| i | $r_i$ | $d_i$ | $N_i$ | $\nu_i$ |
|---|---|---|---|---|
| 1 | 1320.564 | 3.400 | 1.59551 | 39.2 |
| 2 | 68.727 | 3.292 | | |
| 3 | 74.591 | 12.243 | 1.61800 | 63.4 |
| 4 | −192.688 | 0.250 | | |
| 5 | 74.502 | 2.850 | 1.80518 | 25.4 |
| 6 | 49.504 | 8.024 | 1.48749 | 70.1 |
| 7 | 158.671 | 0.128 | | |
| 8 | 42.831 | 7.943 | 1.61800 | 63.4 |
| 9 | 140.480 | 2.300–27.75 | | |
| 10 | −684.017 | 1.500 | 1.77250 | 49.6 |
| 11 | 16.280 | 1.107 | | |
| 12 | 34.531 | 1.400 | 1.77250 | 49.6 |
| 13 | 18.492 | 2.291 | | |
| 14 | −35.897 | 1.300 | 1.69680 | 55.5 |
| 15 | 119.666 | 0.100 | | |
| 16 | 29.082 | 2.500 | 1.80518 | 25.4 |
| 17 | −150.836 | 17.749–2.0 | | |
| 18 | 39.987 | 1.700 | 1.69680 | 55.5 |
| 19 | 95.778 | 13.031–3.45 | | |
| 20 | 15.953 | 2.400 | 1.69680 | 55.5 |
| 21 | 36.985 | 2.074 | | |
| 22 | −35.833 | 1.300 | 1.53172 | 48.9 |
| 23 | 192.527 | 3.339 | | |
| 24 | 37.018 | 1.500 | 1.83400 | 37.2 |
| 25 | 14.096 | 8.900 | 1.48749 | 70.1 |
| 26 | −14.096 | 1.958 | | |
| 27 | −12.279 | 1.500 | 1.83481 | 42.7 |
| 28 | −21.801 | 0.100 | | |
| 29 | 35.301 | 3.000 | 1.54072 | 47.2 |
| 30 | 161.685 | | | |

$m_s/m_{1s} = 0.399$ $m_{2L}/m_{2s} = 2.052$ $m_{4L}/m_{4s} = 2.113$ $X_3/X_4 = 0.631$ ti $ENP_L/f_L = 1.319$ $\overline{\nu}_{1p} = 65.6$

What is claimed is:

1. A high zoom-ratio finite-distance zoom lens having a fixed object-to-image distance which comprises, in order from one side thereof, a first lens unit having a positive focal length, a second lens unit having a negative focal length, a third lens unit having a positive focal length, and a fourth lens unit having a positive focal length, said lens being capable of zooming from a first degree of magnification to a second degree of magnification by means of displacing the first, third and fourth lens units towards said one side, and satisfying the following five conditions:

$$0.3 < m_s/m_{1s} < 0.6 \quad (1)$$

$$1.8 < m_{2L}/m_{2s} < 2.6 \quad (2)$$

$$1.7 < m_{4L}/m_{4s} < 2.5 \quad (3)$$

$$0.1 < X_3/X_4 < 0.9 \quad (4)$$

$$0.9 < ENP_L/f_L < 1.8 \quad (5)$$

where $m_s$: a magnification of the overall system at the first magnification degree end;

$m_{1s}$: a magnification of the first lens unit at the first magnification degree end;

$m_{2s}$: a magnification of the second lens unit at the first magnification degree end;

$m_{4s}$: a magnification of the fourth lens unit at the first magnification degree end;

$m_{2L}$: a magnification of the second lens unit at the second magnification degree end;

$m_{4L}$: a magnification of the fourth lens unit at the second magnification degree end;

$X_3$: an amount of displacement of the third lens unit;

$X_4$: an amount of displacement of the fourth lens unit;

$ENP_L$: a position of an entrance pupil (distance from the first lens surface) at the high magnification end; and $f_L$: a focal length of the overall system at the second magnification degree end.

2. A high zoom-ratio finite-distance zoom lens according to claim 1 wherein the first lens unit comprises: in order from said one side, a first lens element with a negative meniscus, a second positive lens element, a third lens element with a negative meniscus, a fourth positive lens element, and a fifth positive lens element, each of the five lens elements having a convex surface on the side facing said one side.

3. A high zoom-ratio finite-distance zoom lens according to claim 2 wherein the three positive lens elements (the second, fourth and fifth lens elements) in said first lens unit satisfy the following condition:

$$\overline{\nu}_{1p} > 63 \quad (6)$$

where $\nu_{1p}$ is the mean Abbe number of said three positive lens elements in said first lens unit.

4. A high zoom-ratio finite-distance zoom lens according to claim 1 wherein the second lens unit comprises: in order said one side, at least two and less than four negative lens elements and a positive lens element having a convex surface on the side facing said one side.

5. A high zoom-ratio finite-distance zoom lens according to claim 1 wherein the third lens unit comprises a single positive lens element.

6. A high zoom-ratio finite-distance zoom lens according to claim 1 wherein the fourth lens unit comprises: in order from said one side, a positive lens element having a convex surface on the side facing said one side, a negative-meniscus lens element having a concave surface on the side facing said one side, a cemented lens composed of a negative lens element and a biconvex positive lens element, a negative-meniscus lens element having a concave surface on the side facing said one side, and a positive lens element having a convex surface on the side facing said one side.

7. A high zoom-ratio finite-distance zoom lens according to claim 1 wherein the first and fourth lens units are displaced together.

8. A high zoom-ratio finite-distance zoom lens according to claim 1 wherein the second lens unit is fixed with respect to the plane of the side opposite said one side.

9. A high zoom-ratio finite distance zoom lens according to claim 1 wherein said one side is an object side and wherein said first magnification degree is less than said second magnification degree.

10. A high zoom-ratio finite-distance zoom lens according to claim 1 wherein said first magnification degree is 1/12.4, said second magnification degree is 1/3.1 and said lens elements satisfy a following table wherein $r_i$ is a radius of curvature of an i-th lens element surface, $d_i$ is a thickness of a lens element or an aerial distance between two adjacent lens element, $N_i$ is a refractive index and $\nu_i$ is an Abbe index of the lens element having the i-th lens element surface facing said one side and wherein said table is:

| i | $r_i$ | $d_i$ | $N_i$ | $v_i$ |
|---|---|---|---|---|
| 1 | 159.718 | 3.500 | 1.60342 | 38.0 |
| 2 | 63.584 | 1.956 | | |
| 3 | 67.000 | 11.300 | 1.61800 | 63.4 |
| 4 | −722.505 | 0.250 | | |
| 5 | 77.216 | 2.850 | 1.80518 | 25.4 |
| 6 | 48.651 | 8.200 | 1.48749 | 70.1 |
| 7 | 143.202 | 0.200 | | |
| 8 | 45.470 | 7.900 | 1.61800 | 63.4 |
| 9 | 194.955 | 2.300–28.42 | | |
| 10 | −1608.176 | 1.500 | 1.77250 | 49.6 |
| 11 | 15.000 | 1.333 | | |
| 12 | 31.514 | 1.450 | 1.69680 | 55.5 |
| 13 | 20.769 | 2.223 | | |
| 14 | −42.300 | 1.400 | 1.69680 | 55.5 |
| 15 | 73.875 | 0.100 | | |
| 16 | 26.650 | 2.700 | 1.80518 | 25.4 |
| 17 | −725.128 | 20.505–2.5 | | |
| 18 | 45.821 | 1.700 | 1.69680 | 55.5 |
| 19 | 125.182 | 11.618–3.5 | | |
| 20 | 19.823 | 2.400 | 1.69680 | 55.5 |
| 21 | 47.326 | 2.834 | | |
| 22 | −25.362 | 1.400 | 1.53172 | 48.9 |
| 23 | −45.096 | 3.776 | | |
| 24 | 106.198 | 1.500 | 1.83400 | 37.2 |
| 25 | 17.350 | 8.500 | 1.48749 | 70.1 |
| 26 | −17.350 | 4.162 | | |
| 27 | −15.600 | 1.500 | 1.80610 | 40.9 |
| 28 | −26.112 | 0.100 | | |
| 29 | 46.238 | 3.200 | 1.54814 | 45.8 |
| 30 | −184.648 | | | |

11. A high zoom-ratio finite-distance zoom lens according to claim 1 wherein said first magnification degree is 1/12.4, said second magnification degree is 1/3.1 and said lens elements satisfy a following table wherein $r_i$ is a radius of curvature of an i-th lens element surface, $d_i$ is a thickness of a lens element or an aerial distance between two adjacent lens elements, $N_i$ is a refractive index and $v_i$ is an Abbe index of the lens element having the i-th lens element surface on said one side and wherein said table is:

| i | $r_i$ | $d_i$ | $N_i$ | $v_i$ |
|---|---|---|---|---|
| 1 | 168.138 | 3.500 | 1.60342 | 38.0 |
| 2 | 58.686 | 3.989 | | |
| 3 | 63.616 | 12.000 | 1.61800 | 63.4 |
| 4 | −465.854 | 0.100 | | |
| 5 | 90.013 | 2.850 | 1.80518 | 25.4 |
| 6 | 54.096 | 8.000 | 1.48749 | 70.1 |
| 7 | 169.871 | 0.200 | | |
| 8 | 45.588 | 7.900 | 1.61800 | 63.4 |
| 9 | 198.737 | 2.300–28.63 | | |
| 10 | 2818.623 | 1.500 | 1.77250 | 49.6 |
| 11 | 13.866 | 3.373 | | |
| 12 | −43.348 | 1.400 | 1.77250 | 49.6 |
| 13 | 43.348 | 0.411 | | |
| 14 | 25.982 | 2.700 | 1.80518 | 25.4 |
| 15 | −220.685 | 21.349–2.5 | | |
| 16 | 44.514 | 1.700 | 1.69680 | 55.5 |
| 17 | 101.824 | 10.976–3.5 | | |
| 18 | 16.552 | 2.400 | 1.69680 | 55.5 |
| 19 | 28.403 | 3.220 | | |
| 20 | −22.100 | 1.400 | 1.53172 | 48.9 |
| 21 | −43.520 | 2.528 | | |
| 22 | 48.045 | 1.500 | 1.83400 | 37.2 |
| 23 | 16.043 | 8.500 | 1.48749 | 70.1 |
| 24 | −16.043 | 3.603 | | |
| 25 | −13.443 | 1.500 | 1.80610 | 40.9 |
| 26 | −22.439 | 0.100 | | |
| 27 | 39.713 | 3.200 | 1.54814 | 45.8 |
| 28 | 309.057 | | | |

12. A high zoom-ratio finite-distance zoom lens according to claim 1 wherein said first magnification degree is 1/14, said second magnification degree is 1/3.5 and said lens elements satisfy a following table wherein $r_i$ is a radius of curvature of an i-th lens element surface, $d_i$ is a thickness of a lens element or an aerial distance between two adjacent lens element, $N_i$ is a refractive index and $v_i$ is an Abbe index of the lens element having the i-th lens element surface on said one side and wherein said table is:

| i | $r_i$ | $d_i$ | $N_i$ | $v_i$ |
|---|---|---|---|---|
| 1 | 1320.564 | 3.400 | 1.59551 | 39.2 |
| 2 | 68.727 | 3.292 | | |
| 3 | 74.591 | 12.243 | 1.61800 | 63.4 |
| 4 | −192.688 | 0.250 | | |
| 5 | 74.502 | 2.850 | 1.80518 | 25.4 |
| 6 | 49.504 | 8.024 | 1.48749 | 70.1 |
| 7 | 158.671 | 0.128 | | |
| 8 | 42.831 | 7.943 | 1.61800 | 63.4 |
| 9 | 140.480 | 2.300–27.75 | | |
| 10 | −684.017 | 1.500 | 1.77250 | 49.6 |
| 11 | 16.280 | 1.107 | | |
| 12 | 34.531 | 1.400 | 1.77250 | 49.6 |
| 13 | 18.492 | 2.291 | | |
| 14 | −35.897 | 1.300 | 1.69680 | 55.5 |
| 15 | 119.666 | 0.100 | | |
| 16 | 29.082 | 2.500 | 1.80518 | 25.4 |
| 17 | −150.836 | 17.749–2.0 | | |
| 18 | 39.987 | 1.700 | 1.69680 | 55.5 |
| 19 | 95.778 | 13.031–3.45 | | |
| 20 | 15.953 | 2.400 | 1.69680 | 55.5 |
| 21 | 36.985 | 2.074 | | |
| 22 | −35.833 | 1.300 | 1.53172 | 48.9 |
| 23 | 192.527 | 3.339 | | |
| 24 | 37.018 | 1.500 | 1.83400 | 37.2 |
| 25 | 14.096 | 8.900 | 1.48749 | 70.1 |
| 26 | −14.096 | 1.958 | | |
| 27 | −12.279 | 1.500 | 1.83481 | 42.7 |
| 28 | −21.801 | 0.100 | | |
| 29 | 35.301 | 3.000 | 1.54072 | 47.2 |
| 30 | 161.685 | | | |

\* \* \* \* \*